United States Patent [19]
Niekel

[11] Patent Number: 5,372,263
[45] Date of Patent: Dec. 13, 1994

[54] A MODULAR DISPLAY RACK FOR FLAT DATA BOX CARRIERS

[76] Inventor: Edwin J. Niekel, 205, Grote Beer, NL-1188 AZ, Amsterdam, Netherlands

[21] Appl. No.: 959,973

[22] Filed: Oct. 13, 1992

[51] Int. Cl.⁵ .................................................. A47F 7/00
[52] U.S. Cl. ................................................ 211/41; 211/87
[58] Field of Search .............................. 211/41, 40, 87

[56] References Cited

U.S. PATENT DOCUMENTS

| | | | |
|---|---|---|---|
| 4,919,287 | 4/1990 | Hashett et al. | 211/41 |
| 5,040,687 | 8/1991 | Whittington | 211/41 X |
| 5,105,952 | 4/1992 | Knattiger | 211/41 |
| 5,148,925 | 9/1992 | Althoff et al. | 211/41 |
| 5,232,089 | 8/1993 | Kim | 211/41 X |

Primary Examiner—Alvin C. Chin-Shue
Assistant Examiner—Sarah A. Lechok
Attorney, Agent, or Firm—Baker & McKenzie

[57] ABSTRACT

An improved display rack for flat data box carriers, particularly CD-boxes. The display rack is a modular unit which includes a plurality of intermediate locking extensions and two end locking extensions which are configured such that carrier rows are formed between adjacent extensions which house the flat data box carriers. Each row has at least one protrusion and a space above the protusion such that a carrier can be easily removed and replaced in the display rack.

2 Claims, 1 Drawing Sheet

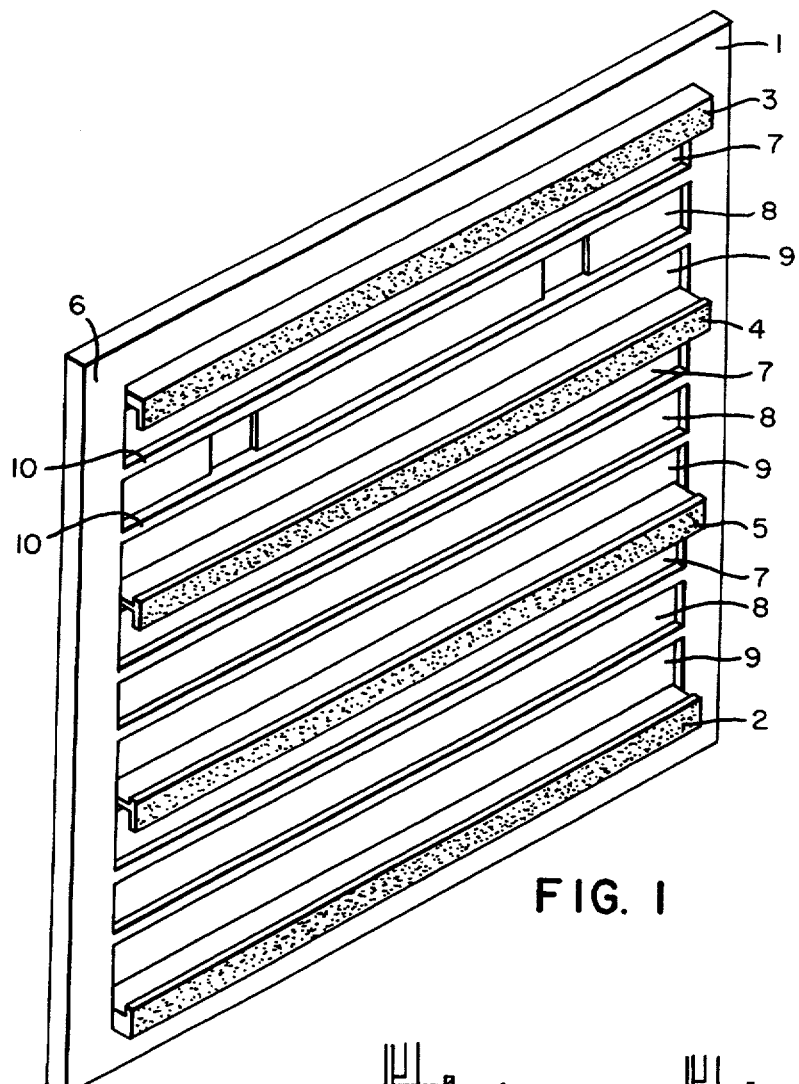
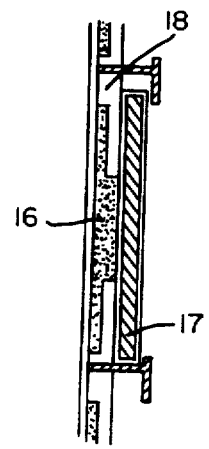
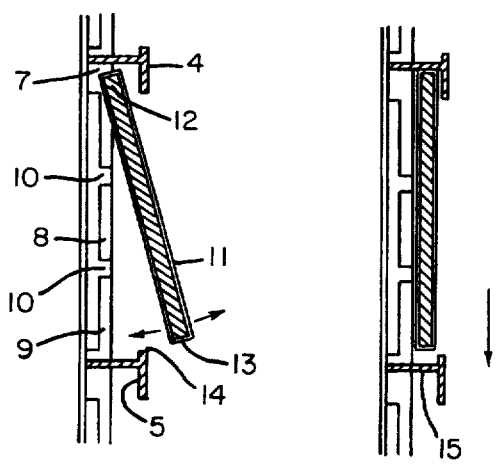
FIG. 1  FIG. 2  FIG. 3a  FIG. 3b  FIG. 3c

A MODULAR DISPLAY RACK FOR FLAT DATA BOX CARRIERS

OBJECTS AND BRIEF SUMMARY OF THE INVENTION

Method for locating and relocating a CD-box in a display rack and display rack for housing and simultaneously locking a number of CD-boxes and/or video-boxes or the like at display.

The invention relates to a method for locating and relocating resp. a carrier, such as CD-box in a display rack and it also relates to a display rack for a number of carriers. Another purpose of the invention is to make available a display rack in which e.g. CD-boxes are normally displayed, however the display rack including special constructional features which altogether provide for simple protection against theft or unauthorized taking out of CD-boxes from the display rack.

At the same time and because of these constructional features applied to the display rack, there exists only one special method or "know-how" to take away CD-box from the display rack.

This special method consists of a sequence of movements, starting with the lifting of the CD-box, of which the lower and upper horizontal edges (opposite edges) are normally held behind overlapping L- or T-shaped profiles. These profiles have a locking function and they are parallelly and equidistantly disposed on the display rack to accomodate a number of CD-boxes in one or several horizontal rows. By slightly raising each CD-box before it can be pulled from the display rack, its lower edge is gradually fully freed from the lower overlapping edge of the locking profile. Once this has been effected, the upper part of the CO-box is allowed to be tilted in a backward direction so as to enable the lower edge of the CD-box to easily pass away in a forward direction from the display rack and simultaneously over the overlapping edge of the profile thereby enabling the CD-box to be taken out entirely from its support on the CD-display rack.

In replacing a CD-box and thereby relocking it in place, the reverse sequence of the aforementioned method is applied, i.e. the upper edge of the CD-box is inserted while lifted under the upper overlapping edge of the (locking) profile and than the CD-box is tilted and thereby brought in parallel relationship to the rear wall of the display rack and so it is allowed to lower down and eventually rest upon the lowermost (horizontal) supporting part of the L- or T-shaped profile, In order to realize the kind of locking and unlocking of a CD-box or the like in a display rack of this kind for such CD-boxes, it will be sufficient that the space behind a CD-box keeps it in an upright position and parallel to the surface of the display rack whereas there should be provided a hollow space which is to be made available at the rear side of the top edge of the CD-box and in its lifted position, to allow the required tilting movement for unlocking the CD-box out from its originally locked display rack position.

It is clear that the wall portion of the display rack behind the CD-box can be mostly flat or it can be provided with a number of protrusions but anyhow the tilting space should be located nearby the upper edge of the CD-box. The display rack could be of any desired dimension and although the expression "CD" is being used here for descriptive purposes only, the invention can also be applied for similar video tapes or the like which are stored in flat boxes of different size. In one and the same display rack is will be possible to store CD-boxes on some rows and video-boxes on other rows, just requiring a difference in equidistant box dimensions, i.e. height and depth.

In the further realization of this invention it has been considered very useful to provide the rear wall of the display rack which becomes visible after taking out a box, with a pictorial decoration. The a decoration could contain an advertising ad or any other sales promotional or semi sales promotional message if desired. Today it is rather common to use historic sales promotional posters from famous brands but the rear wall can of course be used for any and all picture and/or message making the use of such a display rack more attractive than if it just discloses a unicoloured rear wall if one or more CD-boxes have been taken out. Whether the display rack is used in a store or whether it is used in a private room, it can always be made attractive by the choice of a decoration. Such decoration can be made interchangeable by selfadhesive strips or it could be made interchangeable by a backing up, e.g. vacuum formed material as a whole which could be inserted and locked into the frame structure from the backward side of the display rack, thereby showing an attractive desired decoration and/or painting or the like.

DRAWINGS

Other objects and advantages of the present invention will become apparent from the following detailed description of a preferred embodiment thereof taken in conjunction with the accompanying drawings, wherein:

FIG. 1 is a perspective front view of a display rack according to the invention;

FIG. 2 and FIGS. 3a–3c each show a partial simplified cross sectional view of a display rack of FIG. 1; FIG. 2 showing another profile of the back wall portion than the profiles in FIGS. 3a–3c, in which various positions of the box are shown.

DETAILED DESCRIPTION

FIG. 1 is a flat and relatively stiffened frame structure 1, preferably of plastic material, upon which a number of CD-boxes can be arranged side by side and in three different horizontal rows. CD-boxes are lockingly located by means of L-and T-shaped profiles 2, 3 and 4, 5 respectively. These profiles 2–5 are preferably e.g. integrally moulded with the frame 1. In the drawing the equidistant location of two opposite profiles 3–4, 4–5, 5–2 respectively is slightly greater than the individual height of each CD-box. In the drawing a number of CD-boxes could be sidewise inserted on a horizontal row and at both vertical frame sides a closing strip(not shown) could preferably cover the vertical open sided portions at both sides 6 at left and right upon the frame 1 since the CD-boxes really do not need to be inserted through the open side portions as shown in the FIG. 1.

Profiles 2 and 3 are in cross section L-shaped whereas the profiles 4 and 5 are T-shaped. Although a T-shaped symmetrical profile can also be used, the drawing shows that the uneven portions of the profiles, FIGS. 2 and 3, are so positioned that the height of the upper locking rim of the supporting profile to overlap the lower box edge is less than the overlapping height of the lower locking rim for locking the upper box edge. In FIG. 3c it is clearly shown that the position of the CD-box 11, while resting upon the horizontal supporting portion of the T-shaped profile gives the visual outlook that the CD-box 11 is fully located in a locked position resting against the frame portions 10.

The locking of the CD-box 11 in the display rack 1 is shown in FIGS. 3a–3c and the arrows in FIG. 3a indicate either the taking out or the relocation whereas the arrow in FIG. 3b shows the relocation by gravity.

The free space which is available above the upper portion of the CD-box 11 allows for the shifting method and thereafter for tilting the CD-box upper part 12, thereby lifting, see FIG. 3a, it away with its bottom part 13 over the upper edge 14 to unlock the CD-box 11 from its prior position while resting upon the horizontal body 15 of the T-profile 5 as shown in FIG. 3c.

The frame 1 is further provided, at its inner side, facing the rear side of the CD-box 11, with a protruding portion 16 which extends from the flat back surface of the rack. The free space 18 enables the tilting movement of the CD-box at the end of the lifting movement which frees the lower box edge 17 from the edge on the T-profile. The front wall of the frame 1 behind the CD-boxes 11 can easily be made by a piece of vacuum formed material in which any and all protruding portions 16 or other different shapes like the protrusions 10 and the recessed portions 7, 8 and 9 so can be provided for in the most efficient way of production.

Whereas in FIG. 2 a plane rear surface supports the vertically locked CD-box, in FIGS. 3a–c the protruding ridges 10 mark the corresponding circumference portions of the protruded portion 16 in FIG. 2. Any and all desirable configuration can be applied for, provided that its function remains the same. So it would also be feasible to provide the front wall of the frame 1 behind the CD-boxes with a "bombed" surface, consisting of rounded protrusions thereby avoiding sharp edges. Specifically in the event of a vacuum formed support to back up the rear sides of the CD-boxes, it will be advantageous to select rounded off edges, since this surface is to be integrally used for the application of pictures or posters or the like which can be easily applied to the vacuum formed material by e.g. photographic methods. However also selfadhesive strips for decoration may be used for the same purpose and it is further feasible to use the front part of the frame 1 behind the CD-boxes 11 alternatively for other sales promotional purposes. Taking into account that nowadays a great number of CD-boxes and/or video boxes are to be stored away by its users, the present invention now really provides for an attractive display and storage rack for such boxes whereas open spaces are simultaneously to be "covered" by an existing "picture" or a portion thereof, by which still an attractive visual outlook of the empty or partially empty display rack is maintained and highly appreciated.

Furthermore it will be possible to arrange in one and the same display rack rows for the storage of CD-boxes and video-boxes. This could be simply arranged by different equidistant location of T-profiles and by interchangeable vacuum formed portions which can fit by e.g. clip-locking into the relevant parts of the frame 1. Since double CD-boxes are very common now too, the difference in thickness between CD-boxes and video-boxes is sometimes the same. The frame 1 is supposed to be hung along a wall in a shop or in a house room and the hidden locking feature is certainly of major interest for a shop and less important elsewhere.

Other embodiments of the invention may embody the same features. As a matter of fact the locking feature can be improved by making a portion of the rear wall portion behind the CD-box of a partially springy characteristic in such a manner that the lifting movement is still required but the rear wall portion e.g. as a flat wall portion may as a whole be subjected to a tilting movement and thereby fulfill the same function as only the tilting by creating space at the upper side of the CD-box. The value of the advertising surface and/or the decorating surface appears to be very high. The front surfaces of the horizontal profiles may be used for reference numbers to replace CD-boxes at the previous places, or the poster or the like decoration is also printed over these flat surfaces in order not to disturb its general visual outlook.

I claim:

1. A modular display rack having a substantially rectangular shape in elevation view for positioning and locking, unlocking and taking out a flat data box carrier, particularly a CD-box comprising:

a frame portion having upper, lower, and vertical sides which define an outer perimeter of said rack; and a plurality of intermediate longitudinal locking means extending from a surface of said modular display rack such that a first leg of said locking means extends perpendicular to said surface and a second leg of said locking means is integrally secured to a most distal end of said first leg and is perpendicular to said first leg such that said intermediate locking means in cross-section appears as a T-shaped extension; and two end longitudinal locking means extending from said surface of said modular display rack such that a first leg of said end locking means extends perpendicular to said surface and a second leg of said end locking means is integrally secured to a most distal end of said first leg and is perpendicular to said first leg such that said end locking means in cross-section appears as an L-shaped extension and the second leg of said end extension extends toward said plurality of intermediate locking means whereby a carrier holding row is formed between adjacent locking means such that there is an upper locking means and a lower locking means for a given row; and at least one protrusion extending from said surface of said module display rack parallel to said first leg of said plurality of intermediate and two end locking means, located in each of said plurality of rows; and wherein said at least one protrusion of each of said rows is positioned such that a space exist in the region between said protrusion and a corresponding upper locking means such that when said flat data box carrier is positioned in said row a bottom surface of said carrier sits on said first leg of a lower locking means of said row and a rear surface of said flat data box carrier rest against said protrusion of said row such that when it is desired to remove said carrier, said carrier is lifted and tilted against said protrusion which acts as a fulcrum causing an upper portion of said carrier to move into said space thereby allowing said carrier to be removed from said row of said module display rack.

2. A modular display rack as defined in claim 1 wherein said modular display rack further comprises:

a closing strip secured to each of said vertical sides of said frame such that said strips cover vertical open side portions defined by adjacent locking means and said vertical sides.

* * * * *